United States Patent
Boger et al.

(10) Patent No.: US 10,151,895 B2
(45) Date of Patent: Dec. 11, 2018

(54) SYSTEM AND METHOD OF TRANSMITTING ELECTRICITY THROUGH AN INSULATED ENVIRONMENT

(71) Applicant: Altec Industries, Inc., Birmingham, AL (US)

(72) Inventors: David K. Boger, Birmingham, AL (US); Abdellatif Elhomani, Kansas City, MO (US)

(73) Assignee: Altec Industries, Inc., Birmingham, AL (US)

(*) Notice: Subject to any disclaimer, the term of this patent is extended or adjusted under 35 U.S.C. 154(b) by 518 days.

(21) Appl. No.: 14/824,399

(22) Filed: Aug. 12, 2015

(65) Prior Publication Data

US 2016/0049849 A1 Feb. 18, 2016

Related U.S. Application Data

(60) Provisional application No. 62/036,772, filed on Aug. 13, 2014.

(51) Int. Cl.

| | |
|---|---|
| *G02B 6/44* | (2006.01) |
| *H02K 7/18* | (2006.01) |
| *G02B 6/42* | (2006.01) |
| *B66F 9/24* | (2006.01) |

(Continued)

(52) U.S. Cl.
CPC .............. *G02B 6/4415* (2013.01); *B66F 9/24* (2013.01); *B66F 11/046* (2013.01); *B66F 17/006* (2013.01); *G02B 6/4212* (2013.01); *H02K 7/1823* (2013.01)

(58) Field of Classification Search
CPC .................................................. G02B 6/4415
See application file for complete search history.

(56) References Cited

U.S. PATENT DOCUMENTS

| | | | | |
|---|---|---|---|---|
| 4,917,213 A | * | 4/1990 | Kessler | B66F 11/046 |
| | | | | 182/2.11 |
| 2016/0097275 A1 | * | 4/2016 | Santoso | E21B 47/123 |
| | | | | 340/854.7 |

FOREIGN PATENT DOCUMENTS

WO 2013/052178 A2 4/2013

OTHER PUBLICATIONS

"Comparison of Optical Fiber to Copper Wire." LaserMotive, Inc. Date Printed: Mar. 3, 2016; Date Posted: Unknown; <http://lasermotive.com/wp-content/uploads/2012/12/Fiber_vs_Copper_summary2013Jan.pdf>.

* cited by examiner

*Primary Examiner* — Daniel Cavallari-See
(74) *Attorney, Agent, or Firm* — Erise IP, P.A.

(57) ABSTRACT

An insulated utility vehicle for supporting a utility worker during the performance of a task is provided. The utility vehicle comprises a base, a boom assembly, and a utility platform. The base includes a power source of electrical energy and an energy emission assembly for emitting light energy within an enclosed housing. The boom assembly presents a proximal end pivotably attached to the base. An insulated energy transmission assembly associated with the boom assembly for receives and transmits the emitted light energy from the energy emission assembly. The utility platform is secured to a distal end of the boom assembly. An energy reception assembly associated with the utility platform receives the transmitted light energy from the energy transmission assembly and converts at least a portion of the transmitted light energy into electrical energy, which can be utilized by the utility worker in the utility platform to power a device.

16 Claims, 10 Drawing Sheets

(51) Int. Cl.
*B66F 11/04* (2006.01)
*B66F 17/00* (2006.01)

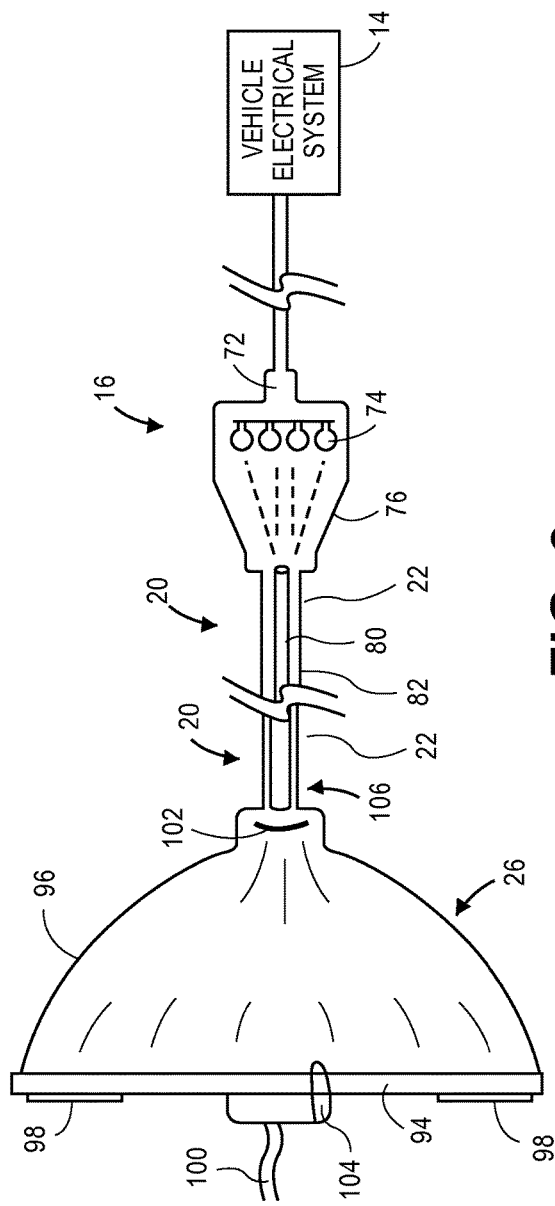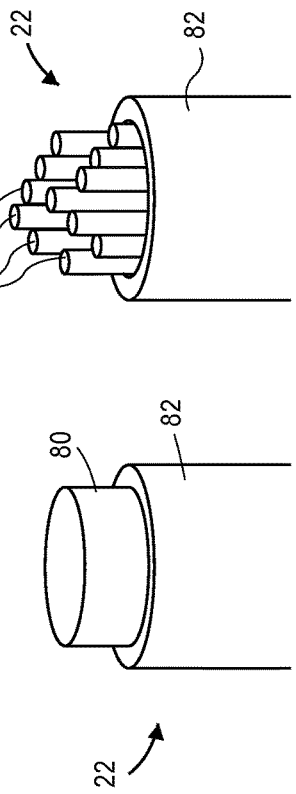

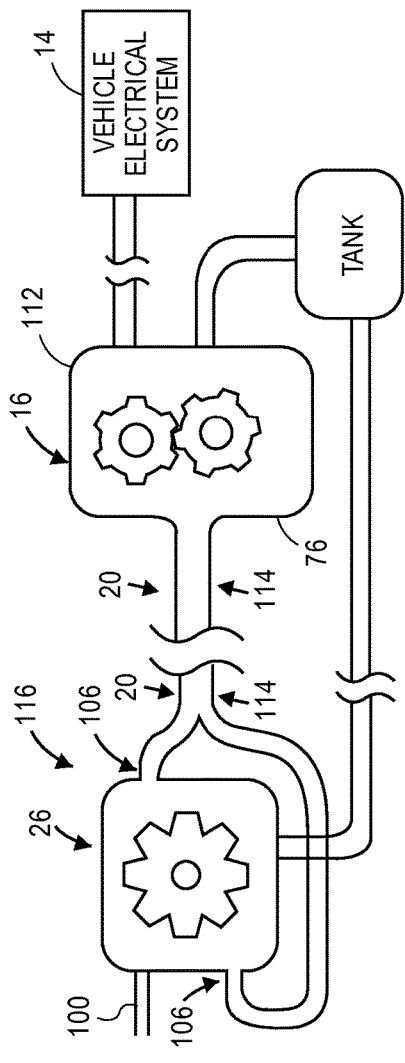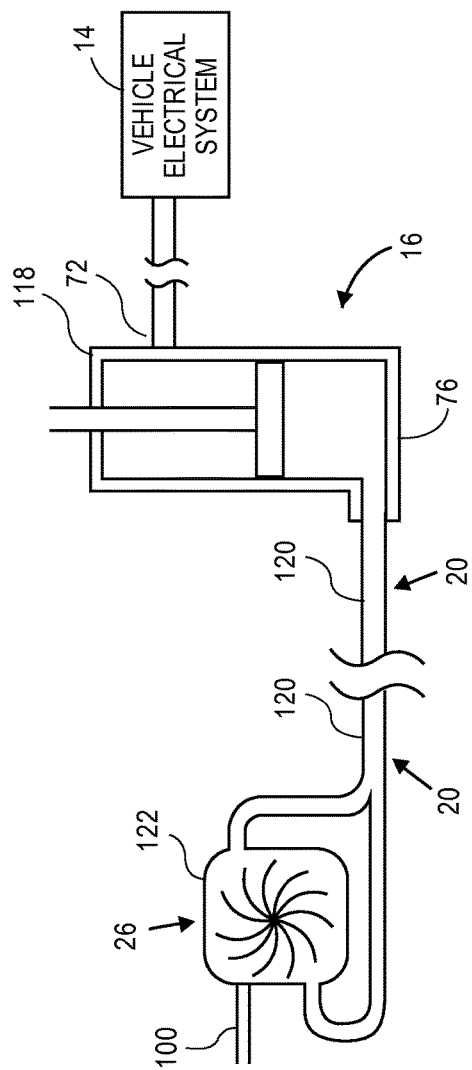

SYSTEM AND METHOD OF TRANSMITTING ELECTRICITY THROUGH AN INSULATED ENVIRONMENT

RELATED APPLICATIONS

This non-provisional patent application claims priority benefit, with regard to all common subject matter, of earlier-filed U.S. Provisional Patent Application No. 62/036,772, filed on Aug. 13, 2014, and entitled "SYSTEM AND METHOD OF TRANSMITTING ELECTRICITY THROUGH AN INSULATED ENVIRONMENT." The identified earlier-filed provisional patent application is hereby incorporated by reference in its entirety into the present application.

BACKGROUND

1. Field

Embodiments of the invention broadly relate to transmitting electricity through an insulated environment. More particularly, embodiments of the invention relate to utility vehicles and the safe provision of electrical power in an insulated utility platform of the utility vehicle.

2. Related Art

Utility workers utilize a utility vehicle to reach inaccessible locations. The utility vehicle generally includes a boom with a utility platform. The utility worker stands in the elevated utility platform while performing a task.

Electric utility workers typically use a utility vehicle to access overhead electric power lines and electric power components for installation, repair, or maintenance. The utility platforms utilized by electric utility workers are highly insulated so as to prevent the discharge of electricity through the utility vehicle, and especially through the utility worker. The insulated nature of the utility platform prevents the transmission of electricity via conventional wiring to electronic components in the utility platform. In order to perform various tasks in the utility platform, the utility worker must utilize other power types for their various tools and equipment. Batteries only provide a limited amount of electrical power, require frequent recharging, and have a limited lifespan. Hydraulic power cannot perform certain tasks and it makes hand-held equipment excessively heavy.

SUMMARY

Embodiments of the invention provide an insulated energy transfer system and a method to transmit electricity through a non-conductive material. A power source on the utility vehicle, such as the engine, provides power to an energy emission assembly. The energy emission assembly emits an alternate, non-electrical, form of energy, which is transmitted via an energy transmission assembly to the utility platform. The alternate form of energy is emitted from the energy transmission assembly into an energy reception assembly. The energy reception assembly generates electrical energy from the alternate form of energy, which is used to power various tools, implements, or other devices used by the utility worker in the utility platform.

A first embodiment of the invention is directed to a utility vehicle for supporting a utility worker during the performance of a task. The utility vehicle comprises a base, a boom assembly, and a utility platform. The base includes a power source of electrical energy. The base also includes an energy emission assembly for receiving electrical energy from the power source and emitting light energy within an enclosed housing. The boom assembly presents a proximal end and a distal end, wherein the proximal end of the boom assembly is pivotably attached to the base. An insulated energy transmission assembly associated with the boom assembly receives and transmits the emitted light energy from the energy emission assembly. The utility platform is secured to the distal end of the boom assembly. An energy reception assembly associated with the utility platform receives the transmitted light energy from the energy transmission assembly and converts at least a portion of the transmitted light energy into electrical energy. The electrical energy converted by the energy reception assembly can be utilized by the utility worker in the utility platform to power a tool, implement, or other device.

A second embodiment of the invention is directed to an insulated energy transfer system for powering a tool, implement, or other device utilized by a utility worker in a utility platform. The insulated energy transfer system comprises an energy emission assembly, an energy transmission assembly, and an energy reception assembly. The energy emission assembly is configured to produce an alternate form of energy from electrical energy received from a power source associated with a base of a utility vehicle. The energy transmission assembly is configured to capture said alternate form of energy produced by the energy emission assembly and transmit the alternate form of energy from the base to the utility platform of the utility vehicle. The energy reception assembly is configured to capture the transmitted alternate form of energy from the energy transmission assembly and convert the captured alternate form of energy into electrical energy. The energy reception assembly presents an output that powers the tool via the electrical energy. The energy transfer system prevents a dangerous discharge of electricity through the utility vehicle. In various embodiments the alternate form of energy is optical photons, energized particles, hydraulic fluid, or pneumatic air.

A third embodiment of the invention is directed to a method of transferring electrical power to a tool, implement, or other device disposed in an insulated utility platform. The method comprises the following steps: providing electrical energy from a power source to an energy emission assembly; converting, via the energy emission assembly, at least a portion of the electrical energy into light energy; capturing at least a portion of the light energy in an energy transmission assembly; aligning a fiber optic cable of the energy transmission assembly along a boom assembly supporting the utility platform; providing an energy reception assembly in the utility platform; converting, via the energy reception assembly, at least a portion of the captured light energy into electrical energy; and providing the tool in the insulated utility platform, such that it may be powered by the converted electrical energy via an output on the energy reception assembly.

Additional embodiments of the invention are directed to the energy emission assembly, the energy transmission assembly, the energy reception assembly, a method of installing the insulated energy transfer system, a method of using the insulated energy transfer system, etc.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 3 is a schematic view of an energy emission assembly and an energy reception assembly;

FIGS. 4A and 4B are perspective views of exemplary fiber optic cables of an energy transmission assembly;

FIG. 11 is a schematic view of another embodiment of the insulated energy transfer system that utilizes hydraulic pressure and a hydroelectric pump to transfer energy; and FIG. 12 is a schematic view of yet another embodiment of the insulated energy transfer system that utilizes pneumatic pressure and an enclosed wind turbine to transfer energy.

Figure 1:
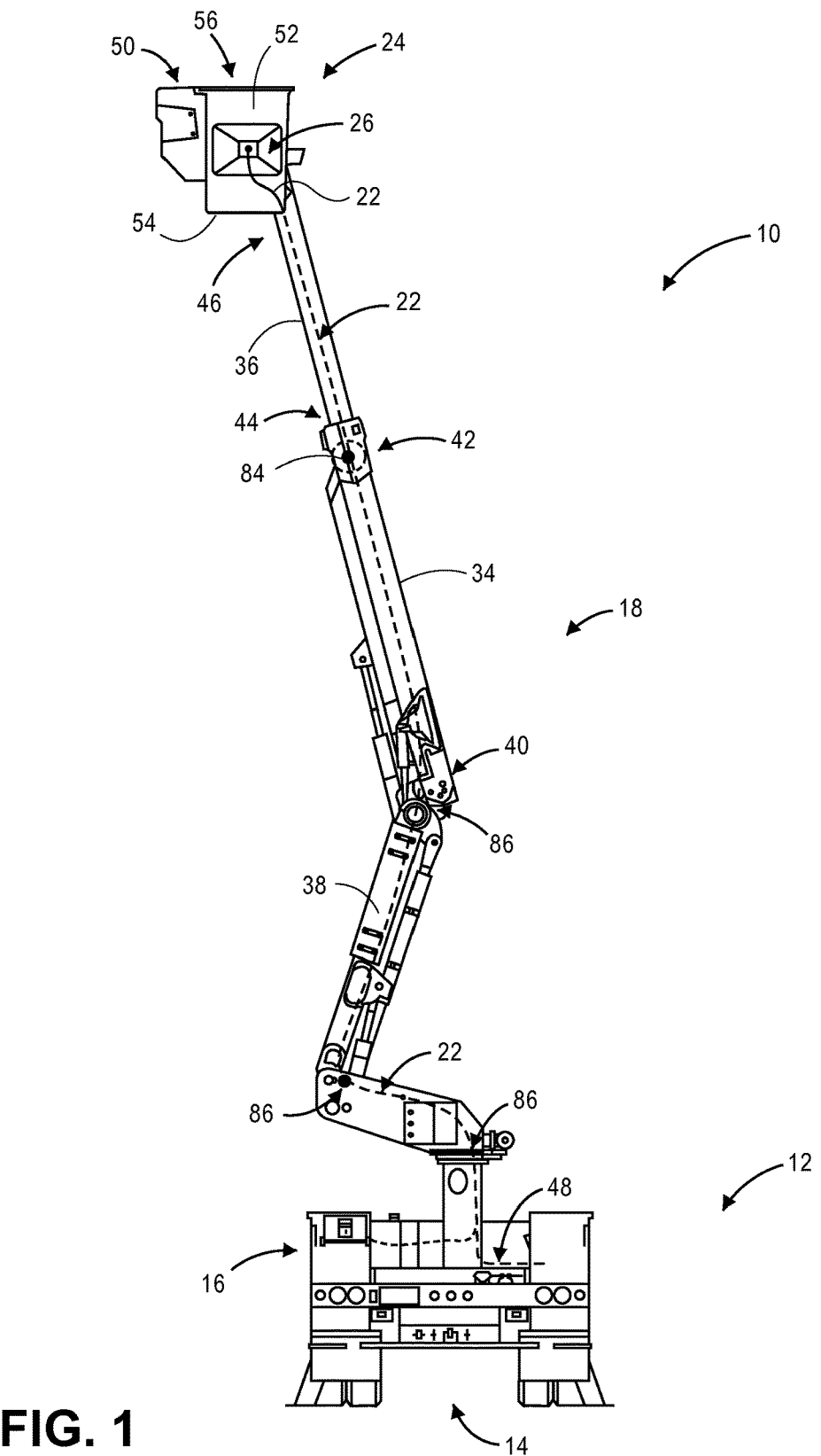
FIG. 1 is a rear view of a utility vehicle, schematically illustrating an insulated energy transfer system with a fiber optic cable running along a boom assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

It should be noted that the utility vehicle industry is used in this application as an exemplary field. The following description is directed to the provision of electrical power at the distal end of insulated booms for the powering of tools, lights, and other devices. However, it should be understood that the system and method may be used in any field. Possible other fields include, but are not limited to, manufacturing, electrical, electronics, computers, power generation, power transfer, solar power, robotics, agriculture, medicine, and naval or marine applications.

In embodiments of the invention, as illustrated in FIGS. 1 and 5-8, a utility vehicle 10 is utilized by a utility worker to perform a task in an insulated environment. The utility vehicle 10 comprises a base 12 having a power source 14 and an energy emission assembly 16, a boom assembly 18, an energy transmission assembly 20 (such as a fiber optic cable 22), and a utility platform 24 having an energy reception assembly 26. The energy emission assembly 16, the energy transmission assembly 20, and the energy reception assembly 26 are referred to herein as the insulated energy transfer system. The utility platform 24 may additionally comprise at least one tool 28, implement, or device for utilizing the transmitted electrical power. In addition, or in the alternative, the utility platform 24 may comprise a battery 30 for storing the transmitted electrical energy and/or a converter 32 for converting the transmitted electrical energy from one form to another.

The components of the utility vehicle 10, as illustrated in FIG. 1, will now be discussed. Broadly, the utility vehicle 10 comprises the base 12, the boom assembly 18, and the utility platform 24. In embodiments of the invention, the base 12 of the utility vehicle 10 is mobile, as in a utility vehicle 10. In other embodiments, the base 12 is stationary. The base 12 provides stability and power to the boom assembly 18.

The base 12 has an engine or other power source 14. The power source 14 has a few primary functions, such as moving the base 12 and operating the boom assembly 18. In embodiments of the invention, the power source 14 is an internal combustion engine that rotates the wheels and/or track of the base 12 to move the base 12 to or around a worksite. In other embodiments, the power source 14 is a battery, a gasoline/electric hybrid, a turbine engine, or the like (not illustrated). In embodiments of the invention, the power source 14 provides power to hydraulic pumps and hydraulic brakes. The hydraulic pumps and brakes manipulate the boom assembly 18 via providing hydraulic power.

In addition to the above-discussed primary functions of the power source 14, the power source 14 may also perform secondary functions such as providing power to tools 28 used by the utility worker, powering safety lights, or the like. As discussed above, due to safety concerns, many boom assemblies and/or utility platforms 24 are formed of dielectric material to prevent the discharge of electricity through the boom assembly 18. In order to maintain this insulated environment, the engine does not provide electrical power to the utility platform 24 via conventional electrical lines or cables, but instead utilizes the insulated energy transfer system. The insulated energy transfer system transmits electrical energy across long distances without the potential for an electrical discharge through the boom assembly 18 and the utility worker. In order to accomplish this, the insulated energy transfer system converts electrical power from the power source 14 into light energy such that the risk of a discharge of electricity is significantly reduced.

The boom assembly 18 comprises at least a first telescoping boom section 34, a second telescoping boom section 36, and a pivoting boom section 38 (as illustrated in FIG. 1). The first telescoping boom section 34 is a hollow, elongated member that presents a proximal end 40 and a distal end 42. At the proximal end 40, the first telescoping boom section 34 is rotatably and/or pivotably coupled to the pivoting boom section 38. The first telescoping boom section 34 can be formed of a metal, a polymer such as fiberglass, or other material. The second telescoping boom section 36 is at least partially disposed within the distal end 42 of the first telescoping boom section 34 and telescopes to extend or retract relative to the first telescoping boom section 34. The second telescoping boom section 36 is an elongated member that presents a proximal end 44 and a distal end 46. The second telescoping boom section 36 is formed of an electrically-resistant polymer, such as fiberglass, or other material. In some embodiments, the first telescoping boom section 34 is also formed of an electrically-resistant polymer, such as fiberglass. The pivoting boom section 38 pivots relative to the base 12 (both vertically and about a central vertical axis)

Figure 8:
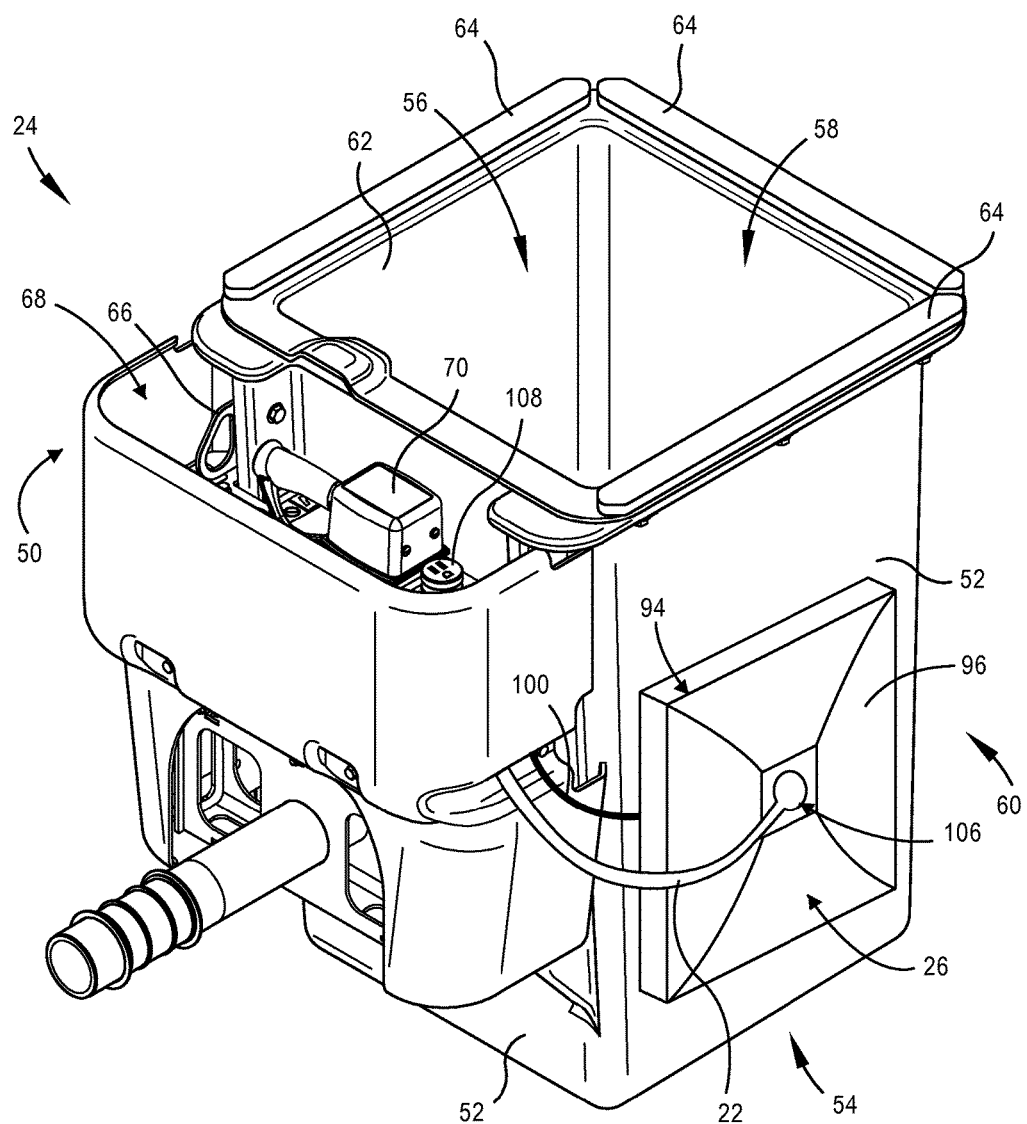
FIG. 8 is a perspective view of the energy reception assembly mounted externally to a utility platform.
Figure 9:
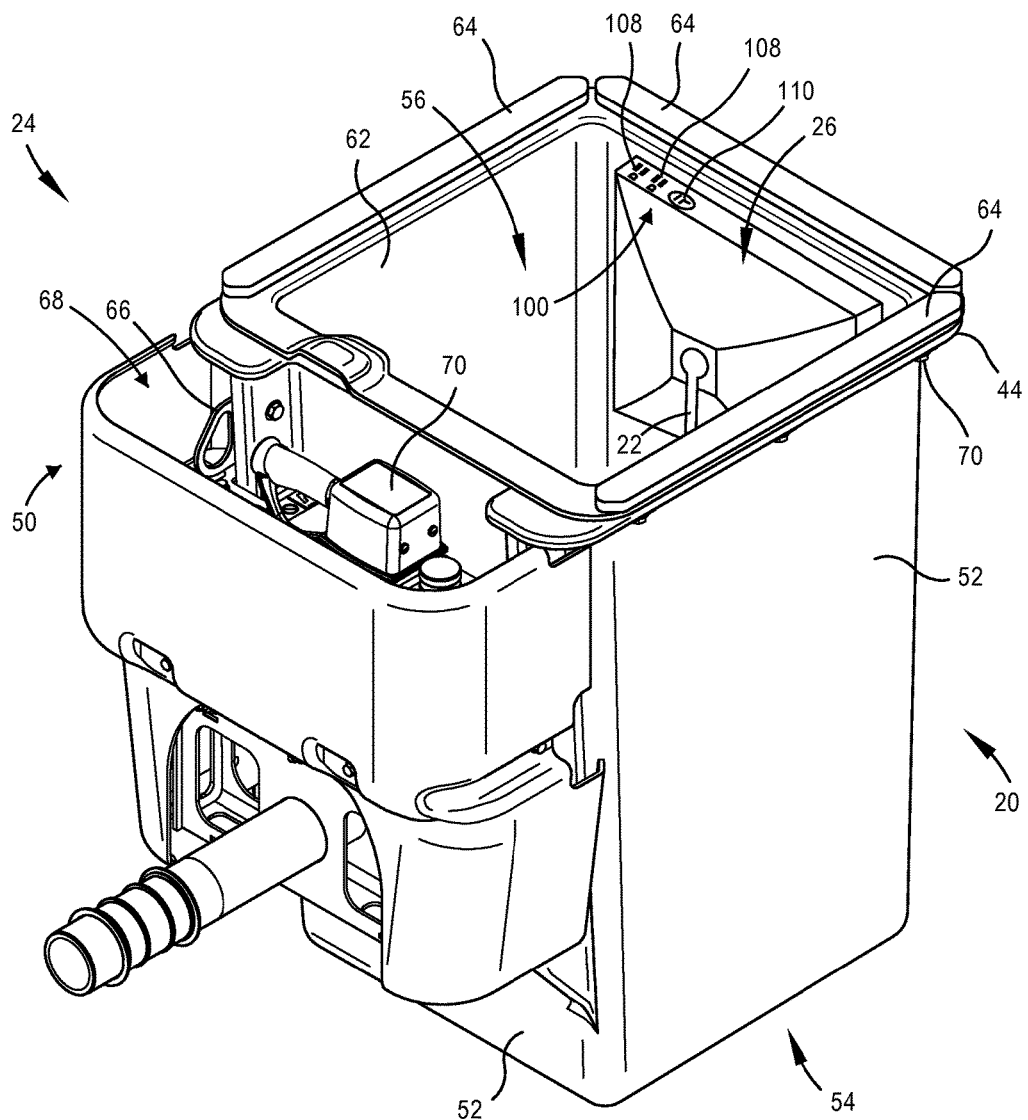
FIG. 9 is a perspective view of the energy reception assembly mounted internally to a utility platform.
Figure 10:
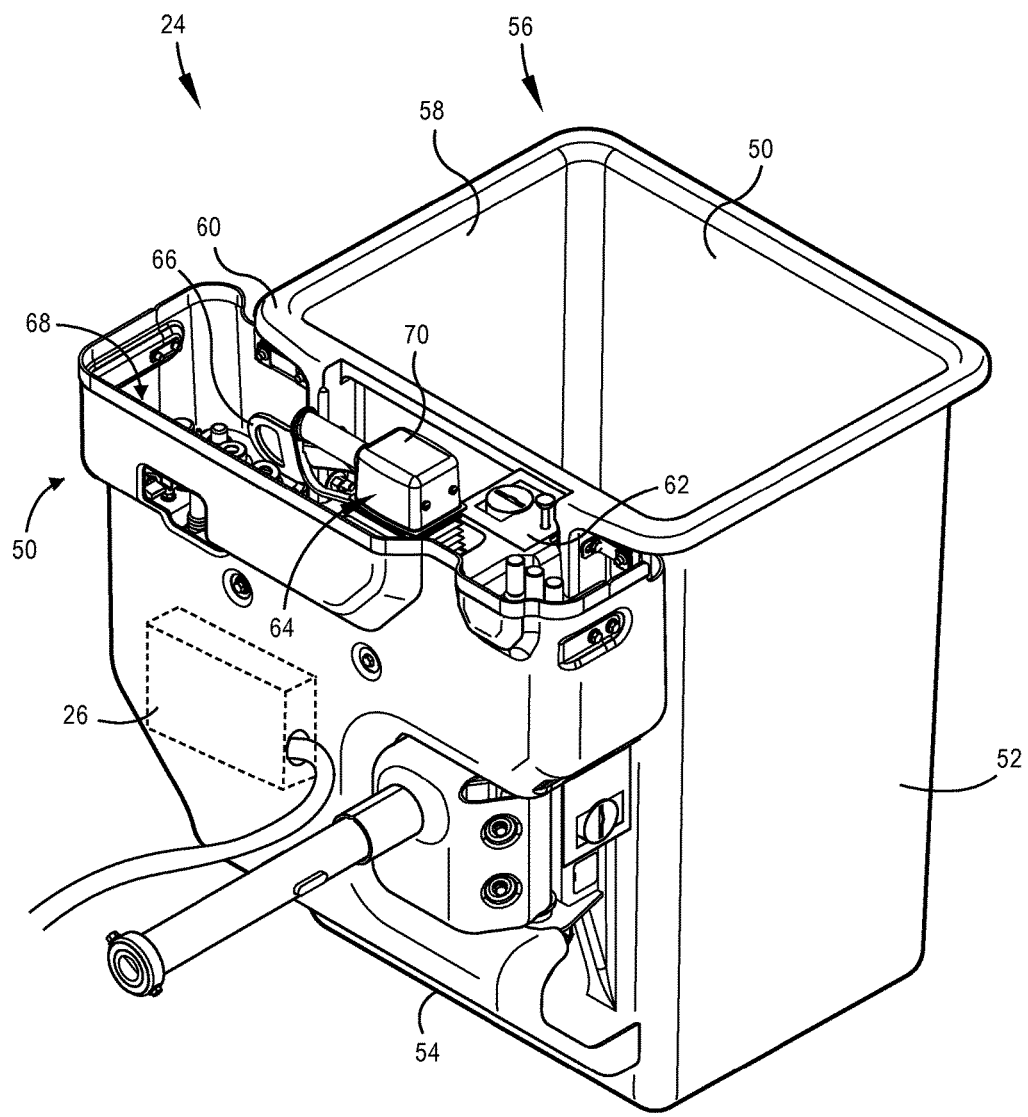
FIG. 10 is a perspective view of the energy reception assembly mounted externally on a control assembly of the utility platform.

The boom assembly 18 is extended, retracted, rotated, and pivoted via a set of lower boom controls 48 and a set of upper boom controls 50. The set of lower boom controls 48 is disposed on or near the base 12, as illustrated in FIG. 1. The set of upper boom controls 50 is disposed on or near the utility platform 24, as illustrated in FIGS. 8-10. In some embodiments of the invention, the set of upper controls is powered at least in part by the insulated energy transfer system. In other embodiments, the set of upper boom controls 50 is powered by a separate powering system such as hydraulic power that is typically used to power and move the boom assembly 18.

As best illustrated in FIGS. 8-10, the utility platform 24 is a bucket or basket that couples to the distal end 46 of the second telescoping boom section 36. In embodiments of the invention, the utility platform 24 comprises four bucket sidewalls 52 and a bucket floor 54 that form a cavity 56 and present an interior segment 58 and an exterior segment 60. The operator stands in the cavity 56 to perform work. The platform may further comprise an insulative liner 62, a liner retention system 64, and a lanyard anchor 66. There may be enough space within the platform for the operator to walk around, as well as store tools 28 or supplies. In embodiments of the invention, the utility platform 24 remains substantially level regardless of the position of the boom assembly 18. In other embodiments, the operator manipulates a set of upper controls to manipulate the utility platform 24 into the flat position.

The four bucket sidewalls 52 of the utility platform 24 may be successively coupled to one another to form a cylinder with a horizontal cross-section that is substantially rectangular. Thus, two of the opposing bucket sidewalls 52 may have a greater width than the other two opposing bucket sidewalls 52. In other embodiments, the four bucket sidewalls 52 may form a cylinder with a horizontal cross-section that is substantially square. The bucket floor 54 is coupled to at least one of the four bucket sidewalls 52.

The set of upper boom controls 50 comprises a dash cover 68 and at least one input 70. In various embodiments of the invention, the input 70 can be a valve handle, a joystick, a button, a switch, or a combination thereof. The dash cover 68 is generally flat or arcuate and presents at least one opening. Each of the at least one opening is situated around each of the at least one input 70. The dash cover 68 may additionally contain written instructions and safety information. In embodiments of the invention, all or a portion of the set of upper boom controls 50 are powered by the insulated energy transfer system.

Figure 2:
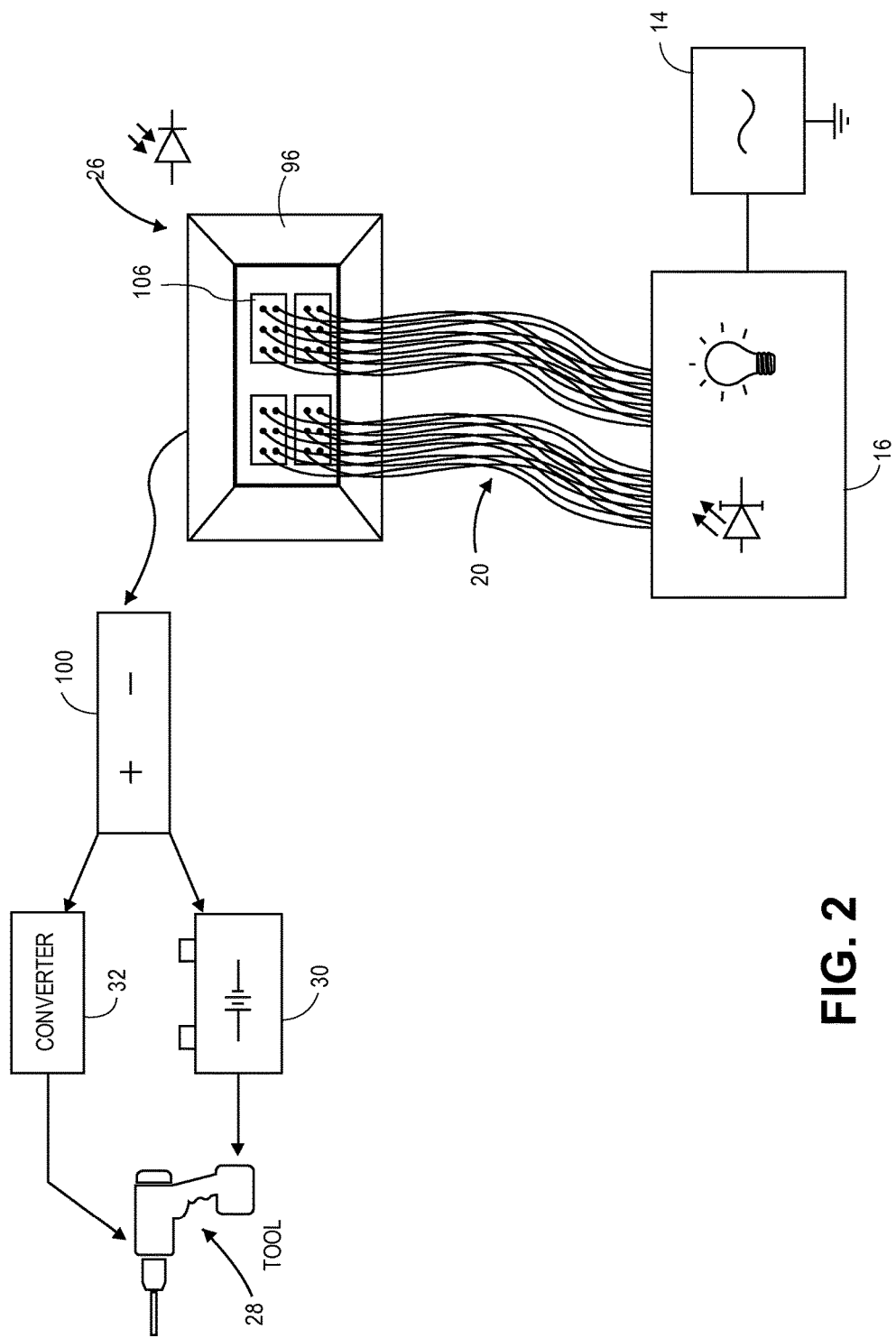
FIG. 2 is a schematic view of the insulated energy transfer system.

The insulated energy transfer system, as illustrated in FIG. 1-3, will now be discussed. The insulated energy transfer system comprises the energy emission assembly 16, the energy transmission assembly 20, and the energy reception assembly 26. The energy emission assembly 16 receives power from the power source 14, such as an engine or electrical system of the utility vehicle 10. The energy emission assembly 16 then converts the power received into photons, i.e., light. The photons travel from the energy emission assembly 16, through the at least one fiber optic cable 22, to the energy reception assembly 26. The energy reception assembly 26 converts the photons into electricity. The electricity then powers various tools 28 or devices located within the utility platform 24 to assist the utility worker in performing the task.

In embodiments of the invention, as best illustrated in FIG. 3, the energy emission assembly 16 comprises an electrical-energy receptor 72, at least one light source 74, and a housing 76. The at least one light source 74 is located within the housing 76. The energy emission assembly 16 is located on the base 12 of the utility vehicle 10. In embodiments, the energy emission assembly 16 is located near the proximal end of the boom assembly 18. The energy emission assembly 16 receives, via the electrical-energy receptor 72 and from electrical lines, power from the power source 14. The power is used to energize the light source 74. The light source 74 is a light emitting diode (LED), incandescent light bulb, a discharge tube, or other light-emitting device or apparatus. The light source 74 generates photons, which are directed into the fiber optic cable 22 via the housing 76.

As schematically illustrated in FIG. 3, the energy emission assembly 16 includes the electrical-energy receptor 72, which is connected via conventional electrical cables to an electrical system of the utility vehicle 10. The electrical-energy receptor 72 then powers the plurality of LEDs located within the housing 76. In some embodiments, the LEDs are uni-directional. In other embodiments, the LEDs are omni-directional. The housing 76 may funnel the light from the LEDs as shown in FIG. 3. In other embodiments, each LED is directly linked to an individual component of the energy transmission assembly 20 (such as the plurality of fiber optic cables 22 as illustrated in FIG. 4B and discussed below).

In embodiments of the invention, the light generated is in a range of 300 nm to 500 nm to duplicate natural sunlight. The solar panel may be adapted to process natural sunlight most efficiently. In other embodiments of the invention, the light generated is in a range of 380 nm to 800 nm to span the visible spectrum. In still other embodiments, the light generated is in a range of 10 nm to 400 nm to span the ultraviolet spectrum. In other embodiments, the solar panel is adapted to receive light of a single phase and/or wavelength. This allows for a more efficient solar panel, because the light can be provided in any phase or phases for optimal energy production.

Figure 5:
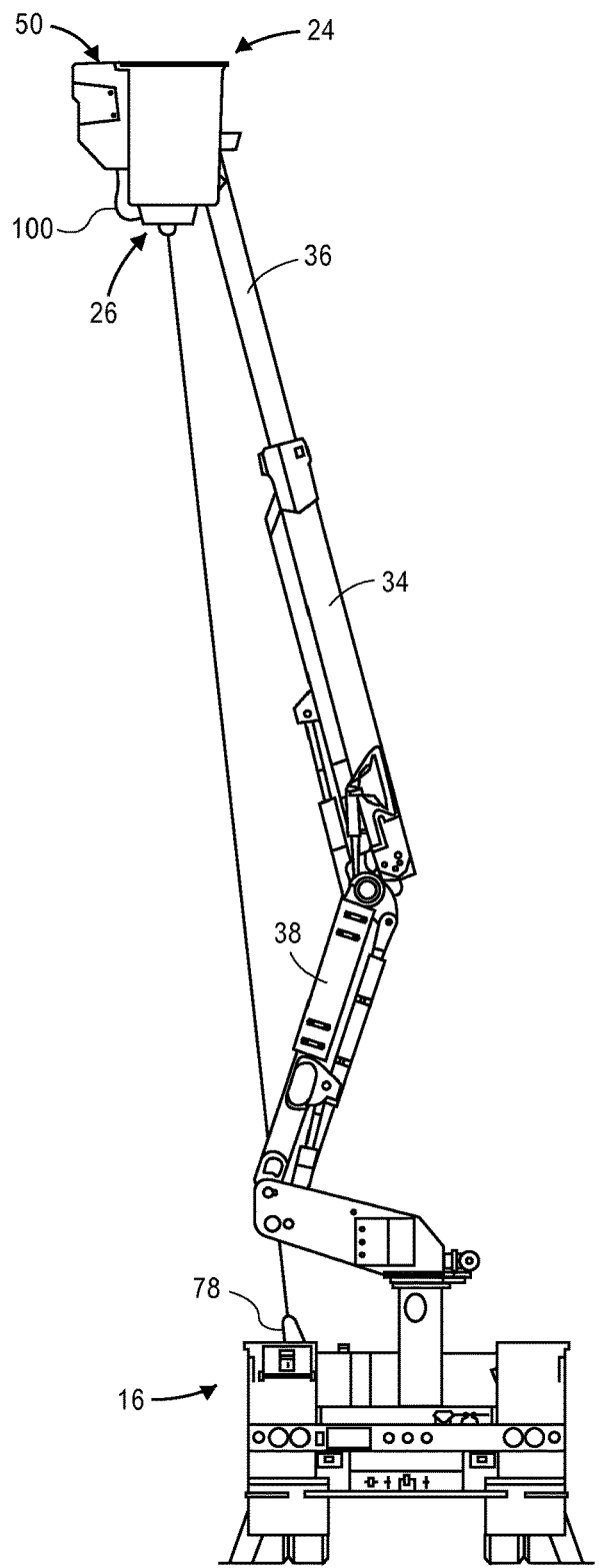
FIG. 5 is a rear view of another embodiment of the invention in which the energy transmission assembly utilizes a laser to transfer energy to the energy reception assembly.

In other embodiments of the invention, as illustrated in FIG. 5, the energy emission assembly 16 is a laser 78. The laser 78 fires a beam of energized particles toward the energy reception assembly 26, that is located on or near the utility platform 24. As an example, the laser 78 may be located on a top portion of the base 12 and the energy reception assembly 26 may be located on a bottom side of the floor 54 of the utility platform 24. In this configuration, once the boom assembly 18 and the utility platform 24 are fully deployed and stabilized, the laser 78 detects the relative orientation of the laser 78 and the energy reception assembly 26. The laser 78 then orients and emits in that direction. A capture lens (not illustrated) on the energy reception assembly 26 then captures the laser 78 energy and scatters it onto the solar panel.

The energy transmission assembly 20 transmits the energy from the energy emission assembly 16 to the energy reception assembly 26 in an insulated manner. In order to prevent the dangerous discharge of electricity through the utility vehicle 10 and potentially the utility worker, the energy transmission assembly 20 does not utilize traditional electrical wires. While shielding is available and effective, traditional electrical wires carry with them an inherent risk of discharge should the shielding become compromised.

In embodiments of the invention, the energy transmission assembly 20 comprises at least one fiber optic cable 22, as illustrated in FIGS. 1-3, 4A, and 4B. The fiber optic cable 22 transmits the photons that were emitted by the energy emission assembly 16 through or adjacent to the boom assembly 18 to the energy reception assembly 26. The fiber optic cable 22 is electrically insulative because it is formed of glass instead of metal. The fiber optic cable 22 comprises at least one optical fiber 80. In some embodiments, the fiber optic cable 22 comprises a single optical fiber 80 (such as illustrated in FIG. 4A) or a plurality of optical fibers 80 that each carry light (such as illustrated in FIG. 4B).

In some embodiments, as illustrated in FIG. 2, a plurality of fiber optic cables 22 may be used. Multiple fiber optic cables 22 provide redundancy and carry additional light. In embodiments of the invention, each of the plurality of fiber optic cables 22 is connected to the energy emission assembly 16 (as illustrated in FIG. 2). In other embodiments, the plurality of fiber optic cables 22 is attached to multiple energy emission assemblies. For example, a utility vehicle 10 may include two energy transfer systems. A continuous energy emission assembly 16 with dedicated fiber optic cable 22 may provide a small amount of power for lights and safety equipment. A selective energy emission assembly 16 with dedicated fiber optic cable 22 may provide a large amount of power to support tools 28 and other energy-hungry machinery. In other embodiments, a backup or emergency energy emission assembly 16 and a backup or emergency energy transmission assembly 20 are provided to allow for electrical power in the utility platform 24 in the event of a failure of the primary system or in an emergency situation.

The plurality of optical fibers 80 is contained within a protective sheath 82 that protects the optical fibers 80 from damage and abrasion from the environment, as illustrated in FIG. 4B. The protective sheath 82 is formed of plastic or another polymer. Crimping of the fiber optic cable 22 is a concern. Unlike traditional electrical cables and hydraulic lines, crimping of a fiber optic cable 22 can produce serious and irreparable damage to the fiber optic fibers 80.

To prevent crimping, in embodiments of the invention, the fiber optic cable 22 is run through boom assembly 18. As schematically shown in FIG. 1, the fiber optic cable 22 may be run inside of, alongside, or adjacent to the boom assembly 18. Many utility vehicles 10 already run hydraulic lines up along the boom assembly 18 to the utility platform 24. This allows for control of the boom assembly 18 via the set of upper controls (discussed above). Accordingly, in embodiments of the invention, the fiber optic cable 22 of the energy transmission assembly 20 is run alongside these hydraulic lines.

As illustrated in FIG. 1 and discussed above, in embodiments of the invention the boom assembly 18 telescopes. In order to accommodate such a telescoping action, some embodiments of the invention include an internal reel 84 and at least one fiber optic junction 86. The fiber optic cable 22 attaches to the fiber optic junction 86 that is associated with the internal reel 84. The fiber optic junction 86 allows the reel to loosen and tighten an upper section of fiber optic cable 22 while a lower section of fiber optic cable 22 can transfer light. The fiber optic junction 86 allows the internal reel 84 to rotate while still allowing the light to transfer. It should be appreciated that in many instances, the power is provided only when the boom assembly 18 is stationary, because the electrical power is only necessary while the utility worker is performing the task, and this is typically only done while the utility platform 24 is stationary. In addition, or in the alternative, optic fiber junctions 86 may be used to accommodate the pivoting of the boom assembly so as to prevent crimping. In these embodiments, the fiber optic junctions 86 allow two sections of fiber optic cable 22 to pivot relative to each other without crimping.

Figure 6:
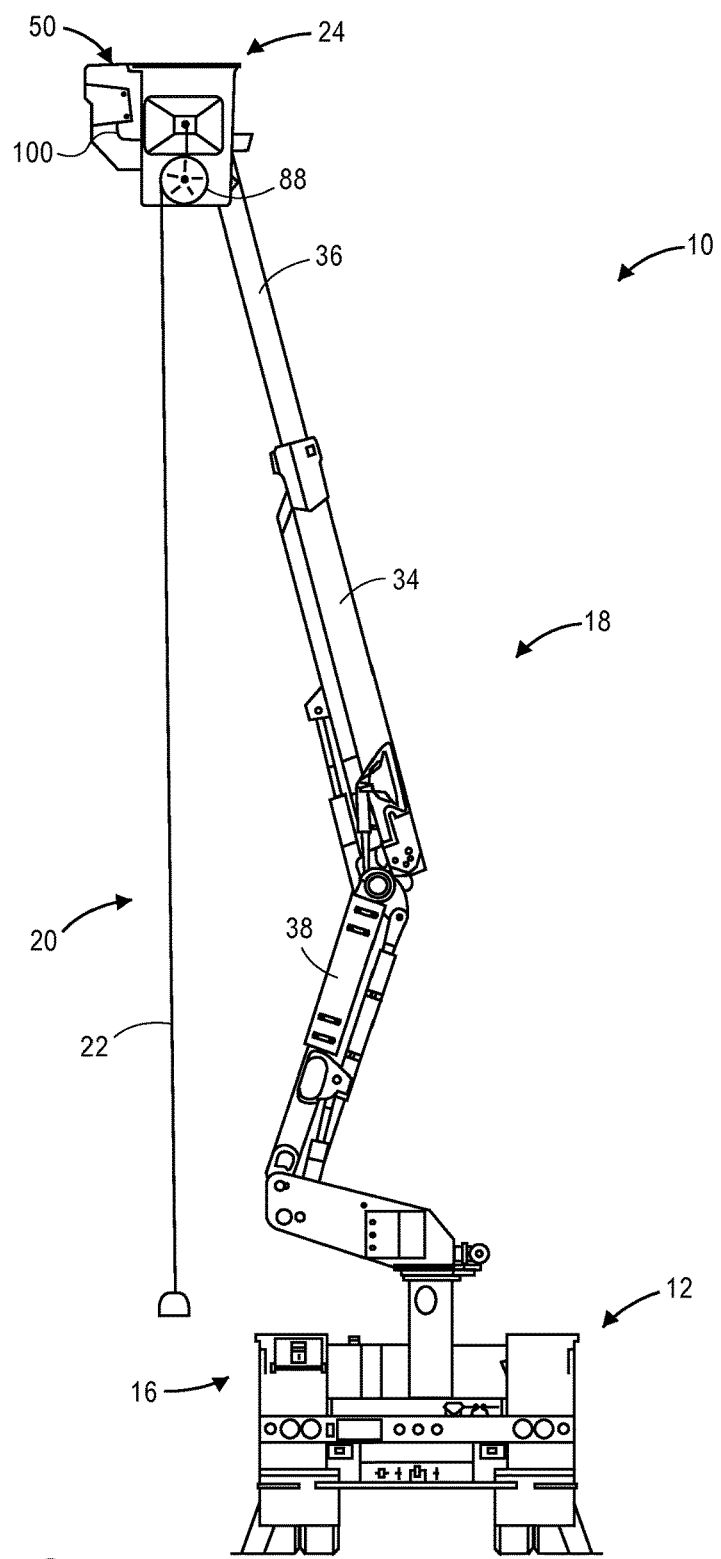
FIG. 6 is a rear view of yet another embodiment of the invention in which the fiber optic cable is lowered via an external reel.

In other embodiments of the invention, crimping is prevented by only running the fiber optic cable 22 once the utility platform 24 is in place. In these embodiments, as illustrated in FIG. 6, the fiber optic cable 22 is held in the utility platform 24 while the boom assembly 18 is moving. Then, once in place but before the performance of the task, the fiber optic cable 22 is lowered from the utility platform 24 via an external reel 88. The external reel 88 may be hand-operated, battery-operated, spring-operated, hydraulic-operated, or the like. An assistant utility worker on the ground then retrieves the end of the fiber optic cable 22 and plugs the end into the energy emission assembly 16. The energy emission assembly 16 then emits the energy as discussed above. Upon completion of the task, the assistant utility worker then unplugs the fiber optic cable 22 from the energy emission assembly 16 and allows the external reel 88 to retrieve the fiber optic cable 22. If another task is to be performed at another boom assembly 18 orientation, the fiber optic cable 22 may remain plugged in depending on the two relative orientations. In this embodiment, the insulated energy transfer system may be utilized as a backup system to replenish batteries that die, or the like, and not as the primary source of power for tools 28.

Figure 7:
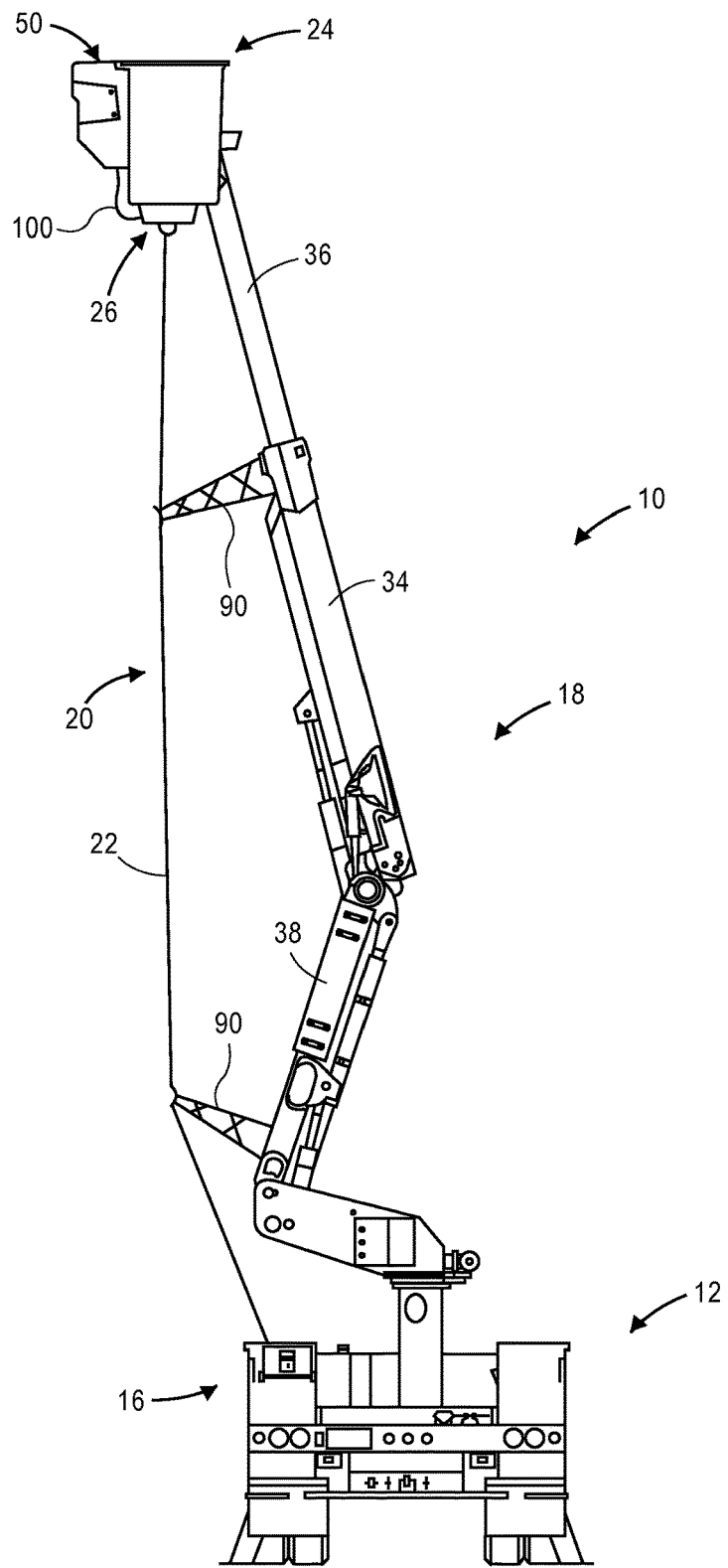
FIG. 7 is a rear view of yet a further embodiment of the invention in which guide struts keep the fiber optic cable clear of the boom assembly.

In some embodiments of the invention, as illustrated in FIG. 7, the boom assembly 18 and/or the base 12 include a guide strut 90 for routing the fiber optic cable 22 away from the boom assembly 18. The guide strut 90 keeps the fiber optic cable 22 from crimping but allows the fiber optic cable 22 to be continually plugged into both the energy emission assembly 16 and the energy reception assembly 26. As an example, the guide strut 90 may be oriented along a side of the boom assembly 18 and guide the fiber optic cable 22 such that it remains substantially parallel with the boom assembly 18. As the boom assembly 18 rotates, pivots, and extends, the guide strut 90 allows an external reel 88 to elongate and retract based upon the straight-line distance between the energy emission assembly 16 and the energy reception assembly 26.

In some embodiments of the invention, the fiber optic cable 22 of the energy transmission assembly 20 may additionally carry information to and from the utility platform 24. For example, such information could include sensor readings, location and orientation information, power availability information, commands, and the like. In some embodiments, additional fiber optic cable 22 is dedicated to the sending of information between the base 12 and the utility platform 24.

As discussed above, in some embodiments of the invention as illustrated in FIG. 5, the energy transmission assembly 20 is a laser 78. The laser 78 transmits energy without the fiber optic cable 22. However, lasers are susceptible to atmospheric interference and significant inefficiencies. A laser 78 may also present a danger to utility workers that look directly into it. As such, these embodiments present the laser 78 atop the base 12 where the assistant operator could not reach the laser 78. The laser 78 also detects the target (i.e. the energy reception assembly 26) and accurately emits the laser 78 only while the target is stationary.

Typically a laser is comprised of a pump source, a gain medium, and an optical resonator. The pump source is the power supply that provides the energy for the laser beam. Energy from the pump source excites the gain medium to produce an emission of photons. The gain medium concentrates the photons. The gain medium also determines the laser beam's frequency. The optical resonator comprises a highly reflective mirror and a partially reflective mirror. The optical resonator allows the laser beam to pass through the partially reflective mirror, such that it is a highly concentrated beam of energy. Some embodiments of the laser comprise a plurality of gain mediums and optical resonators.

The energy reception assembly 26 will now be discussed. The energy reception assembly 26 is located on or near the utility platform 24, as illustrated in FIGS. 5-7. In embodiments of the invention, the energy reception assembly 26 receives photons, i.e. light, from the energy emission assembly 16 via the fiber optic cable 22. The energy reception assembly 26 then converts these photons into electrical energy in an efficient manner. The electrical energy produced is less than the energy input into the insulated energy transfer system, but the transmission is performed through a non-conductive medium. The energy reception assembly 26 comprises a solar panel 94, a frame 96, a mounting assembly 98, and an output 100.

The solar panel 94 comprises a plurality of solar photovoltaic modules electrically connected to each other and mounted on a supporting plate. Most solar panels output direct current (DC) power, although some output alternating current (AC) power. Embodiments of the invention utilize solar panels 94 in a variety of sizes and output ratings. The size of the solar panel 94 may be based upon the availability of space to fit the solar panel 94 on or near the utility platform 24. The output rating, which measures the output of the solar panel 94 under standard conditions, may be based upon the intended uses of the tools 28 and devices, as discussed below. As discussed above, the solar panel 94 may be optimized to a certain wavelength and/or phase of light. Unlike traditional solar panels that must accept natural light, embodiments of the present invention utilize specialized solar panels that are optimized for efficiency.

In one embodiment of the invention, the solar panel 94 is exchangeable by application. For example, if the utility worker is planning to utilize an electricity-intensive tool 28 or device, he may install a larger solar panel 94 or one with a larger output. He may additionally install a plurality of solar panels 94 to provide the necessary power for the task. In another embodiment, he installs an entire new energy reception assembly 26 instead of the solar panel 94 itself. This may be because different size solar panels would require different size frames.

In one embodiment of the invention, the energy reception assembly 26 is adapted to be selectively directed to the sun. This may be advantageous in the event of a failure of the energy emission assembly 16 and/or the fiber optic cable 22. It may also be advantageous in that it minimizes the power drawn from the power source 14. In this embodiment, the utility worker could place the solar panel 94 into the frame 96 during low-light operations.

The frame 96 houses the solar panel 94. The frame 96 receives the fiber optic cable 22 and emits the light onto the solar panel 94. In some embodiments, the frame 96 includes a scatter lens 102 to ensure even coverage of the emitted light across the solar panel 94. In embodiments of the invention, the frame 96 is at least partially opaque and slightly larger than the solar panel 94. The frame 96 provides structural support for the solar panel 94 and prevents damage. In one embodiment, the frame 96 is permanently secured to the solar panel 94. In another embodiment, the frame 96 is selectively secured to the solar panel 94, such that the utility worker can remove the solar panel 94 if desired.

In some embodiments of the invention, at least a portion of the frame 96 is formed of one-way glass to allow natural sunlight onto the solar panel 94. In some embodiments, this portion of the frame 96 is adapted to be toggled between opaque and transparent or translucent by the utility worker. This could be utilized in bright conditions. In other embodiments, the no portion of the frame 96 is transparent or translucent because the photons, via the fiber optic cable 22, already provide the optimal amount of light for the solar panel 94.

In embodiments of the invention, as illustrated in FIG. 3, the frame 96 may also include a light sensor 102 for detecting the amount of light received in the energy reception assembly 26. Based upon the reading on the light sensor 102, the energy reception assembly 26 may instruct the energy emission assembly 16 to provide more light, detect a break in the fiber optic cable 22, request that the utility worker adjust an angle or other setting of the energy transfer system, provide an audible warning to the user that insufficient power is being generated, etc.

In embodiments of the invention, the energy reception assembly 26 includes at least one gasket 104. The gasket 104 is disposed around the frame 96, the solar panel 94, the fiber optic cables 22, etc. The gasket 104 prevent light loss and leakage around these connection points. In these embodiments, the gasket 104 is utilized because any leaking of light reduces the power produced. The gasket 104 may be a polymeric structure configured to fit between the pieces, a resin or caulk applied during the manufacturing of the energy reception assembly 26, a paint applied after manufacturing, etc. It should be appreciated that for the above-discussed reasons, the energy emission assembly 16 may also include a gasket 104 for the prevention of light leakage.

The mounting assembly 98 mounts the solar panel 94 and/or the frame 96 on or near the utility platform 24. In one embodiment, the mounting assembly 98 is permanently secured to the utility platform 24. In another embodiment, the mounting assembly 98 is removably secured to the utility platform 24. In yet another embodiment, there is no mounting assembly 98, and the energy reception assembly 26 is placed into the utility platform 24 but not secured.

In one embodiment of the invention, the mounting assembly 98 mounts the energy reception assembly 26 onto the exterior segment 60 of one of the bucket sidewalls 52 (discussed below) of the utility platform 24, as discussed below. In another embodiment, the mounting assembly 98 mounts the energy reception assembly 26 onto the bucket floor 54. In yet another embodiment of the invention, the mounting assembly 98 mounts the energy reception assembly 26 to the tool 28 or device that will utilize the electrical power transmitted.

FIG. 8 depicts an embodiment of the invention in which the energy reception assembly 26 is disposed on the exterior segment 60 of one of the bucket sidewalls 52. In this embodiment, the mounting assembly 98 traverses the bucket sidewall 52 so as to provide a secure mount for the energy reception assembly 26. This embodiment may be advantageous for retrofitting existing utility platforms 24. The exterior segment 60 of the bucket sidewall 52 is not otherwise being utilized and the energy reception assembly 26 can safely reside there.

FIG. 9 depicts an embodiment of the invention in which the energy reception assembly 26 is disposed in the cavity 56 on the interior segment 58 of one of the bucket sidewalls 52. In this embodiment, the mounting assembly 98 traverses the bucket sidewall 52. This embodiment may be advantageous for utility platforms 24 in which multiple varies tools 28 are often used. The location of the energy reception assembly 26 makes the plugging and unplugging of tools 28 easy for the utility worker. However, this embodiment also reduces the amount of space in which the utility worker has to operate.

FIG. 10 depicts an embodiment of the invention in which the energy reception assembly 26 is a component of or otherwise associated with the set of upper boom controls 50. For newly-produced utility platforms 24 and/or utility vehicles 10, this embodiment will reduce the profile presented by the energy reception assembly 26 and keep it away from the utility worker, while still providing a convenient output 100 in or near the set of upper boom controls 50.

The output 100 of the energy reception assembly 26 transmits the electrical power to external tools 28 or devices. The output 100 may comprise a power outlet 108, such as a socket for receiving a plug, or a DC connector 110. In one embodiment the output 100 provides the socket. In another embodiment, the output 100 sends the generated electrical power to the converter 32. In yet another embodiment, the utility worker may select whether to utilize the converter 32, based upon the tool 28 or device to be utilized.

In some embodiments of the invention, the energy reception assembly 26 further includes the converter 32, as illustrated in FIG. 2. The converter 32 changes the form of the electric power to AC from DC, or to DC from AC. In some embodiments, the converter 32 is secured to the tool 28 or device. In other embodiments, the converter 32 is secured to the frame 96, solar panel 94, or mounting assembly 98. The converter 32 may also be removable, such that the utility worker can engage the converter 32 if necessary for the specific tool 28 to be used to perform the specific task.

The battery 30 stores at least a portion of the electric power produced. The battery 30 is located on or near the utility platform 24. In some embodiments, the battery 30 is a component of the energy reception assembly 26. For example, the battery 30 may be stored internally within the energy reception assembly 26. In other embodiments, the battery 30 is selectively removable. In some embodiments, the battery 30 is charged directly by the utility vehicle 10 or by a battery 30 charger at a headquarters location associated with the utility vehicle 10 prior to operations. Then, during operations, the energy transfer system recharges the battery 30 as it becomes depleted through the powering of the various tools 28. In some embodiments, when in operation, the battery 30 is covered such that the utility worker (for safety reasons) cannot directly access it. In yet other embodiments, there is no battery 30 and generated electrical power is utilized directly or lost.

The utility worker uses the electrical power transmitted by the insulated energy transfer system to power various tools 28 and devices located within the utility platform 24. Typically, the various tools 28 and devices are perform secondary functions (i.e. apart from the movement of the base 12 and the pivoting of the boom assembly 18). The tools 28 and devices powered depend on the field and on the task to be performed. The tools 28 and devices that could utilize the electric power include, but are not limited to, lights, lasers, testing equipment, jibs, winches, lanyard detectors, communications equipment, battery chargers, and handheld power tools.

Some devices may be continually powered while the utility vehicle 10 is in operation. These continually powered devices could include lights, the lanyard detectors, and various sensors. Other tools 28 may be selectively powered by the operator to perform specific tasks. These specific tasks are usually related to the specific job to be performed by the utility worker. For example, if the utility worker is replacing a transformer atop a utility pole, the tasks may include using an In other embodiments of the invention, the tool 28 includes the energy reception assembly 26. Because certain tools 28 may require additional power, AC power, or require a long run time to complete their usual task, the energy reception assembly 26 may be a part of the tool 28. In these embodiments, the tool 28 and the energy reception assembly 26 are permanently or selectively secured to each other. The energy transmission assembly 20 terminates in the utility platform 24, such that the energy reception assembly 26 may be selectively connected thereto by the utility worker. This reduces the weight and space taken up by the energy transmission assembly 20 when it is not necessary. It also allows for energy reception assemblies to be of a size and shape appropriate for the tool 28. Some tools 28 may require a very large energy reception assembly 26, while other tools 28 may have energy reception assemblies small enough to be handheld along with the tool 28 itself.

Another embodiment of the invention will now be discussed. In embodiments of the invention as illustrated in FIG. 11, the insulated energy transfer system utilizes hydroelectric power to provide electrical energy in the utility platform 24. The utility vehicle 10 utilizes hydraulics to perform many functions such as moving the boom assembly 18, operating large tools 28 such as digger derricks, and the like. Typically, hydraulic lines run to the utility platform 24 such that the set of upper boom controls 50 can operate. The insulated energy transfer system of these embodiments, therefore utilizes a hydraulic pump 112 associated with the base 12, the hydraulic lines 114 (either existing and multipurpose or dedicated), and a hydroelectric turbine 116 in the utility platform 24.

In this embodiment, the energy emission assembly 16 includes a hydraulic pump 112. Most utility platforms 24 already include a hydraulic pump 112 for pressurizing hydraulic fluid in the hydraulic lines 114. The hydraulic pump 112 is adapted to create a high pressure to move the various components of the utility platform 24. In embodiments of the invention, the insulated energy transfer system utilizes the standard hydraulic pump 112 utilized in the utility vehicle 10. In other embodiments, a dedicated high-flow pump is utilized to provide hydraulic fluid, water, or another fluid. In lieu of or in addition to high pressure, a high flow rate allows the energy reception assembly 26 (i.e. the hydroelectric turbine 116) to generate a sufficient amount of power.

In this embodiment, the energy transmission assembly 20 includes a hydraulic line 114. Typical utility vehicles 10 comprise a plurality of hydraulic lines 114 along with related hydraulic valves and relays. The energy transmission assembly 20 may utilize existing hydraulic lines 114 or may include additional hydraulic lines 114 dedicated for the energy transmission assembly 20. Typically, the energy transfer system will only operate while the utility platform 24 is stationary. This is because the utility worker is typically only performing the task once the utility platform 24 is set in a certain location. Therefore, the hydraulic lines 114 are typically not being otherwise utilized during the performance of the task and can be utilized (at least in part) for the transfer of hydraulic fluid to the energy reception assembly 26.

In this embodiment of the invention, the energy reception assembly 26 includes a hydroelectric turbine 116. The hydroelectric turbine 116 converts the flowing hydraulic fluid into electrical energy. The electrical energy is then utilized by the tool 28, as discussed above. The hydroelectric turbine 116 is a miniaturized version of the hydroelectric turbines used in hydroelectric power plants. The flowing hydraulic fluid spins the hydroelectric turbine 116 at a high rate. Following flowing through the hydroelectric turbine 116, the hydroelectric fluid is returned to the tank via a return hydraulic line. The hydraulic fluid is then again pressurized by the pump and returned to the energy reception assembly 26.

In yet other embodiments of the invention as illustrated in FIG. 12, the energy emission system includes an energy emission assembly 16 that is a pneumatic pump 118 to move air through pneumatic lines 120 (being the energy transmission assembly 20). In this embodiment, the energy reception assembly 26 is essentially an enclosed wind turbine 122 that turns in response to the flowing air, and thereby creates electrical energy. In some embodiments, the utility vehicle 10 utilizes pneumatic power to move the boom assembly 18 and power the other tools 28. In other embodiments, the utility vehicle 10 utilizes hydraulic power to move the boom assembly 18, but uses pneumatic power to transfer electric power to the tool 28.

It should be appreciated that the various discussed embodiments herein are less efficient than energy transfer by traditional electrical wiring. While this is typically disadvantageous, the insulated energy transfer system prevents deadly and dangerous discharges of electricity through the utility vehicle 10. As discussed above, the utility vehicle 10 creates more than sufficient power, especially while the utility is generally stationary during the performance of the task.

Various methods of the invention will now be discussed. A first method is directed to a method of transferring power through an insulated environment. A second method is directed to installing the insulated energy transfer system. A third method is directed to using the insulated energy transfer system.

A method of transferring electrical power to a tool 28 disposed in an insulated utility platform 24 comprises the following steps: providing electrical energy from a power source 14 to a energy emission assembly 16; converting, via the energy emission assembly 16, at least a portion of the electrical energy into light energy; capturing at least a portion of the light energy in an energy transmission assembly 20; aligning a fiber optic cable 22 of the energy transmission assembly 20 along a boom assembly 18 supporting the utility platform 24; providing an energy reception assembly 26 in the utility platform 24; converting, via the energy reception assembly 26, at least a portion of the captured light energy into electrical energy; and providing the tool 28 in the insulated utility platform 24, such that it may be powered by the converted electrical energy via an output 100 on the energy reception assembly 26.

A method of installing the insulated energy transfer system includes the following steps: securing the energy emission assembly 16 on or near the base 12 of the utility platform 24; plugging a power cable from an electrical system of the utility platform 24 into the energy emission assembly 16; securing the energy transmission assembly 20 to the energy emission assembly 16 such that the energy transmission assembly 20 captures the alternate form of energy emitted by the energy emission assembly 16; aligning the energy transmission assembly 20 to the utility platform 24; securing the energy transmission assembly 20 to the utility platform 24; securing the energy reception assembly 26 to the utility platform 24; and plugging the energy transmission assembly 20 to the energy reception assembly 26.

A method of using the insulated energy transfer system includes providing electrical power to the energy emission assembly 16, capturing the light emitted by the energy emission assembly 16, directing the captured light into the energy reception assembly 26, converting the captured light into electrical power, and utilizing the electrical power to power a tool 28.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. A utility vehicle including an insulated energy transfer system, the utility vehicle configured for supporting a utility worker during the performance of a task, the utility vehicle comprising:
   a base including a power source of electrical energy;
   a light source associated with the base for receiving electrical energy from the power source and emitting light energy within an enclosed housing;
   a boom assembly presenting a proximal end and a distal end,
   wherein the proximal end of the boom assembly is pivotably attached to the base;
   an insulated fiber optic cable for receiving and transmitting the emitted light energy from the light source;
   a utility platform secured to the distal end of the boom assembly; and
   an energy reception circuit associated with the utility platform for receiving the transmitted light energy from the fiber optic cable,
   said energy reception circuit converting at least a portion of the transmitted light energy into electrical energy,
   wherein the electrical energy converted by the energy reception circuit powers a tool utilized by the utility worker in the utility platform.

2. The utility vehicle of claim 1, wherein the power source of the base primarily provides power to the utility vehicle and secondarily provides power to the light source.

3. The utility vehicle of claim 1, wherein the light source includes a plurality of light emitting diodes for producing said light energy.

4. The utility vehicle of claim 1, wherein the fiber optic cable is secured at least partially within the boom assembly.

5. The utility vehicle of claim 4, further comprising
an internal reel to accommodate a telescoping action of the boom; and
a fiber optic relay to prevent crimping of the fiber optic cable.

6. The utility vehicle of claim 1, further comprising
an external reel disposed on the utility platform,
wherein substantially all of the fiber optic cable is configured to be emplaced around the external reel while the boom assembly is moving,
wherein a lower end of the fiber optic cable is configured to be lowered once the boom assembly is in place and plugged into the light source.

7. The utility vehicle of claim 1, further comprising
a guide strut secured to the boom assembly to guide the fiber optic cable away from the boom assembly to prevent crimping of the fiber optic cable.

8. The utility vehicle of claim 1, wherein the energy reception circuit includes a solar panel for converting the light energy to electrical energy.

9. The utility vehicle of claim 1, further comprising a converter to convert the electrical energy from the energy reception circuit into alternating current.

10. The utility vehicle of claim 1, further comprising a battery for storing said output of the energy reception circuit such that it may be later utilized by the utility worker.

11. An insulated energy transfer system for powering a tool utilized by a utility worker in a utility platform, the insulated energy transfer system comprising:
an light source configured to produce an alternate form of energy from electrical energy,
wherein the light source is configured to receive said electrical energy from a power source associated with a base of a utility vehicle;
an insulated fiber optic cable configured to capture said alternate form of energy produced by the light source,
wherein the fiber optic cable is configured to transmit the alternate form of energy from the base to the utility platform of the utility vehicle; and
an energy reception circuit configured to capture the transmitted alternate form of energy from the fiber optic cable,
wherein the energy reception circuit converts the captured alternate form of energy into electrical energy,
wherein the energy reception circuit presents an output that powers the tool via the electrical energy,
wherein the insulated energy transfer system prevents a dangerous discharge of electricity through the utility vehicle.

12. The insulated energy transfer system of claim 1, wherein the alternate form of energy is optical photons.

13. The insulated energy transfer system of claim 12, wherein the fiber optic cable is disposed along a boom assembly of the utility vehicle.

14. The insulated energy transfer system of claim 12, wherein the fiber optic cable is configured to be stored on a reel in the utility platform and dropped to the ground upon emplacement of the utility platform,
wherein the fiber optic cable is configured to be plugged into the light source.

15. The insulated energy transfer system of claim 12, wherein the light source comprises a laser and the energy reception circuit comprises a scatter lens.

16. The insulated energy transfer system of claim 11, further comprising a converter to convert the electrical energy from the energy reception circuit into alternating current.

* * * * *